No. 12,748. REISSUED FEB. 4, 1908.

A. S. DENNIS.

COMPUTING MACHINE.

APPLICATION FILED DEC. 11, 1907.

2 SHEETS—SHEET 1

WITNESSES.
Arthur S. Remberg.
Nathan F. Fretter

INVENTOR,
Adolphus S. Dennis
BY Bates, Fowler & Hull
ATTYS.

No. 12,748. REISSUED FEB. 4, 1908.
A. S. DENNIS.
COMPUTING MACHINE.
APPLICATION FILED DEC. 11, 1907.
2 SHEETS—SHEET 2.
FIG. 4
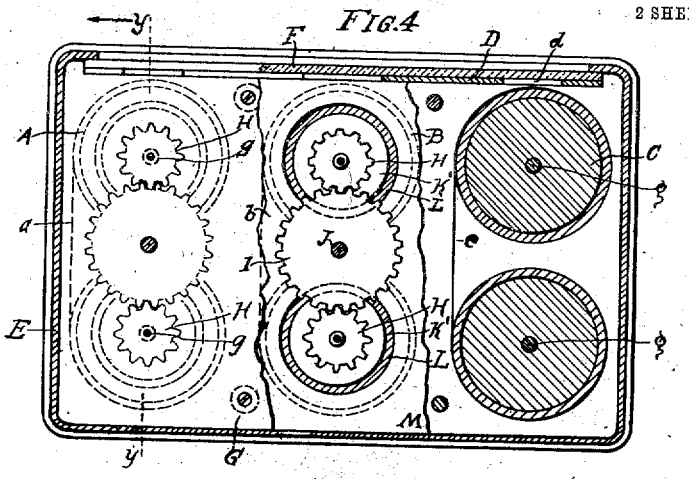
FIG. 5
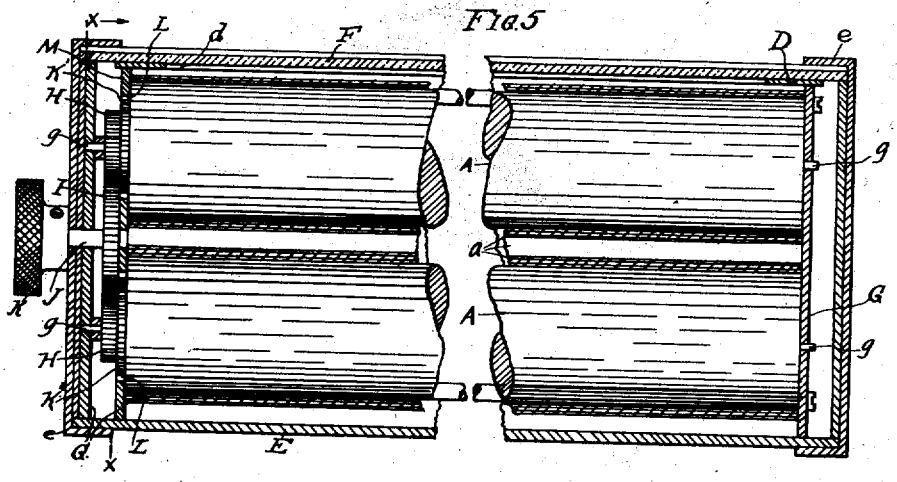
FIG. 6
| | | | |
|---|---|---|---|
| a | 1 | 2 | 3 |
| | 2 | 4 | 6 |
| | 3 | 6 | 9 |
| | 4 | 8 | 12 |
| | 5 | 10 | 15 |
| | 6 | 12 | 18 |
| | 7 | 14 | 21 |
| | 8 | 16 | 24 |
| | 94 | 188 | 282 |
| | 95 | 190 | 285 |
| | 96 | 192 | 288 |
| | 97 | 194 | 291 |
| | 98 | 196 | 294 |
| | 99 | 198 | 297 |
| | 100 | 200 | 300 |
FIG. 7
| | | |
|---|---|---|
| b | 101 | 102 |
| | 202 | 204 |
| | 303 | 306 |
| | 404 | 408 |
| | 505 | 510 |
| | 606 | 612 |
| | 707 | 714 |
| | 808 | 816 |
| | 9494 | 9388 |
| | 9595 | 9690 |
| | 9696 | 9792 |
| | 9797 | 9894 |
| | 9898 | 9996 |
| | 9999 | 10098 |
| | 10100 | 10200 |
FIG. 8
| | | |
|---|---|---|
| c | 201 | 202 |
| | 402 | 404 |
| | 603 | 606 |
| | 804 | 808 |
| | 1005 | 1010 |
| | 1206 | 1212 |
| | 1407 | 1414 |
| | 19095 | 19190 |
| | 19296 | 19392 |
| | 19497 | 19594 |
| | 19698 | 19796 |
| | 19899 | 19998 |
| | 21100 | 20200 |
WITNESSES.
Arthur S. Remberg.
Nathan F. Fretter
INVENTOR.
Adolphus S. Dennis.
BY Baldwin, Fowler & Hull.
ATTYS.

UNITED STATES PATENT OFFICE.

ADOLPHUS S. DENNIS, OF CLEVELAND, OHIO, ASSIGNOR, BY MESNE ASSIGNMENTS, TO THE CALCULUS COMPANY.

COMPUTING-MACHINE.

No. 12,748. Specification of Reissued Letters Patent. Reissued Feb. 4, 1908.

Original No. 842,138, dated January 22, 1907, Serial No. 349,161. Application for reissue filed December 11, 1907. Serial No. 406,120.

*To all whom it may concern:*

Be it known that I, ADOLPHUS S. DENNIS, a citizen of the United States, residing at Cleveland, in the county of Cuyahoga and State of Ohio, have invented a certain new and useful Improvement in Computing-Machines, of which the following is a full, clear, and exact description, reference being had to the accompanying drawings.

My invention relates to computing machines, and is an improvement on a machine for which an application was filed by me December 19th, 1904, Serial No. 237,439; and the improvement consists in the construction and combination of parts substantially as shown and described, and more particularly pointed out in the claims.

My aim is to produce a simple computing device of small size with a wide range of work and wherein the manipulation is speedy and definite and especially adaptable for quick results and whereby any given problem for which the machine is adapted may be computed and the answer read at a glance. As shown, the machine is adapted for computing sums in multiplication or division, but is not necessarily limited to this use.

Figure 1:
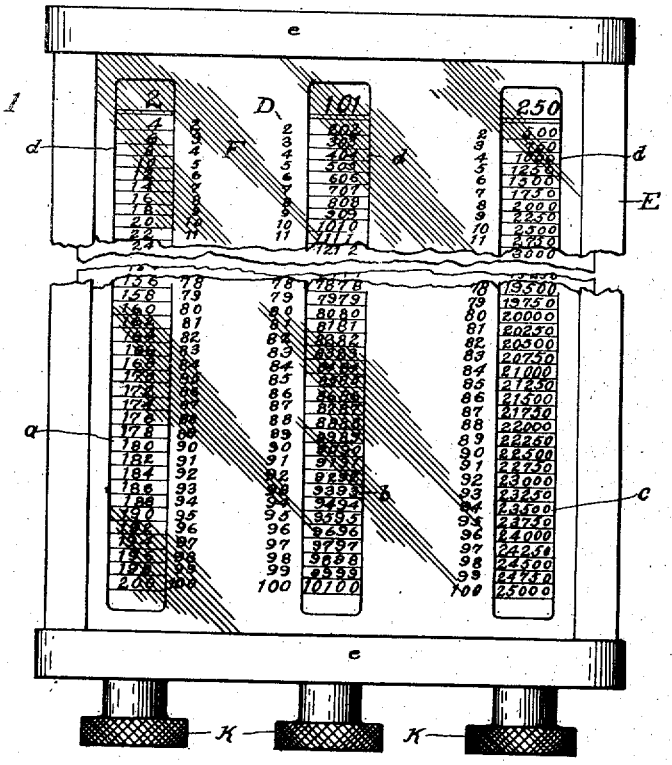
Figure 2:
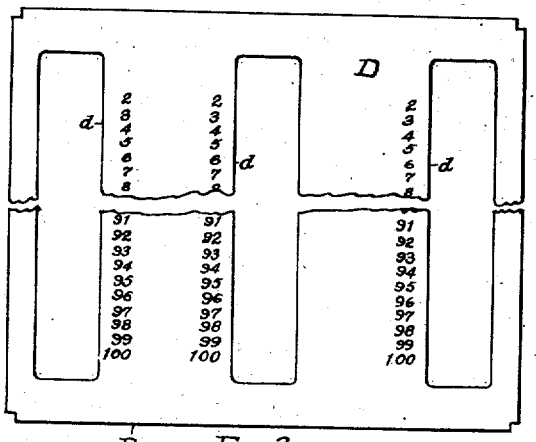
Figure 3:
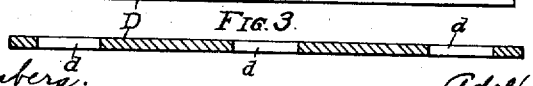

In the accompanying drawings, Figure 1 is a plan or face view of the machine broken away at its center, and Fig. 2 is a face view of the index plate used in said machine. Fig. 3 is a cross section of the index plate above described. Fig. 4 is a cross section of different portions of the machine looking in from line *x x* Fig. 5. Fig. 5 is a longitudinal section on line *y—y* Fig. 4, and with the central portion of the device broken away. Figs. 6, 7 and 8 are separate face views of the computation sheets attached to the first, second, and third set of rollers respectively.

One of the main and most important features of my improved machine is embodied in the plural arrangement of independently rotatable sets of rollers, A, B, and C, each set of which is adapted to operate singly for the computation of arithmetical problems or in combination and jointly when used with an index plate D. To these ends I utilize separate sheets of flexible strips, the opposite ends of which are fastened to the oppositely arranged roller in each set, and which sheet is adapted to wind upon one roller as it is unwound from the other roller, a joint action and the rotation of both rollers in the same direction being provided for by gearing, as hereinafter more fully described. Each set of rollers, A, B, and C, is thus equipped with sheets *a*, *b*, and *c*, respectively, and each sheet is provided upon its exposed face with columns of figures in parallel lines and with a designating figure at the top of each column, which represents either the multiplicand or divisor of each item in its respective column. In the present instance sheet *a* has a series of parallel columns numbered from "1" to "100", inclusive, and the items in each column represent either the product or the dividend as related to the designating figure at the top, and said items are consecutively arranged to aline with certain figures upon index plate D, numbered from "1" to "100" inclusive, to represent the multiplier or quotient of an example in either multiplication or division, as the case may be.

Index plate D is slotted at *d* in the several places directly over the different sets of rollers to expose single columns of figures upon the respective sheets, and as said sets of rollers are independently rotatable, any desired column may be brought into view. Thus, for example, if "2" were the known multiplicand, sheet *a* upon rollers A would be operated to bring the column designated by "2" into view, as seen in Fig. 1, and then, choosing any one of the figures upon the index plate—say "100"—it will be seen at a glance that the product is "200", which latter figure is directly opposite upon sheet *a*.

Sheets *b* and *c* are exactly similar in arrangement and operate the same as sheet *a* above described, except that different figures are used. Thus, sheet *a* has its columns of figures arranged and designated from "1" to "100" inclusive, whereas sheet *b* is numbered and arranged from "101" to "200" inclusive, and sheet *c* from "201" to "300" inclusive. Thus, the three sheets taken together have 300 columns of figures, each column of which is designated at its head by its proper number. Any one of the three sheets may be operated to bring any particular column into view to read the answer in a problem of multiplication or division within the range of the figures on the selected column and the index plate.

In a problem of multiplication the index plate column of figures represents multipliers, the heading at the top of any column on either sheet represents the multiplicand, and any item of a column of figures upon said sheet represents the product, that is, each item of the sheet opposite the item upon the index plate being the product thereof and of the multiplicand at the top of the exposed column of the sheet. To find the quotient in a problem of division, the number at the head of any column upon either sheet is used as the divisor, any number in a column on said sheet as the dividend, and the number on the index plate opposite the one selected on said sheet is the quotient. Thus the true and correct answer for any problem in multiplication or division may be readily ascertained by bringing any one of the column of figures on the sheet attached to the rollers into view opposite the column of figures on the index plate, and the range of multiplication and division is only limited by the number of columns or number of figures in each column. For practical reasons there must be a limit; otherwise the device would be too cumbersome to handle because of its size. I have, therefore, conceived the idea of a plurality of sets of rollers and separate sheets arranged side by side, said rollers being independently rotatable and each additional set of rollers and sheets therefor having columns of figures of higher denomination than the one preceding. The advantage of this construction arises from the fact that by a joint use of the several sets of rollers and separate sheets a very wide range of arithmetical problems can be easily and quickly computed. To illustrate this point, let us take an example in multiplication wherein the multiplicand runs into the thousands, and, say, is of four figures, as "2101". The highest multiplicand is "300" and is on sheet *c*, and, therefore, no single roll or sheet has the product thereon; but by using rollers A and B and sheets *a* and *b*, said multiplicand the product of any multiplier upon the index plate can be obtained thus; roller A would be operated to bring column "2" on sheet *a* into view, as seen in Fig. 1, and then rollers B would be rotated to expose column "101". Then reading from left to right the heading numbers of sheets *a* and *b* read "2101" as the multiplicand. Now taking any item upon the index plate as the multiplier,—say—"3"—the product is seen opposite said multiplier, a portion upon each sheet, and must be read from left to right, the total appearing as "6" on sheet *a* and "303" on sheet *b* and reading "6303", as the correct product. If "10" were used for the multiplier, the reading would be somewhat different, as the correct product is obtained by adding the products upon each sheet opposite the multiplier "10" together, thus:

```
   20
 1010
 ----
21010
```

In this case the column "2", roll A, does not stand alone as a units-column, but becomes the thousands-column, and the units, tens and hundreds column is on the roll to the right. Taking a still larger number as the multiplicand to bring the rollers C and sheet *c* into use—say "2,101,250"— and using "100" as the multiplier, the product is obtained by rotating rollers A to bring column "2" into view, then rotating rollers B to expose column "101," and finally operating rollers C to expose column "250". Column "2", roll A, becomes the millions-column and six imaginary ciphers are added to the item on the sheet *a* opposite the multiplier on the index-plate, the column on sheet *b*, rollers B, represented by "101", becomes thousands, tens-of-thousands, and hundreds-of-thousands column and three imaginary ciphers are added to the item on sheet *b* opposite the multiplier selected, and finally the column on sheet *c*, represented by "250", becomes the units, tens and hundreds column. The three items on the respective sheets opposite the multiplier selected—in this example "200"—are added together thus:

```
200 000 000
 10 100 000
     25 000
-----------
210, 125, 000
```

This is the correct product of the example given, and any product can be thus obtained having any given multiplicand and a multiplier within the number of the columns on the several sheets and the items on the index-plate.

Referring now more particularly to the details of construction, it will be seen that the device comprises a rectangular box or casing E open at its top, excepting for a glass cover F, which rests over and upon index-plate D. Caps or pieces *e* inclose the casing at its ends and confine and hold the various parts in place. Rollers, A, B and C have each trunnions or a shaft *g* with bearings in inner walls or plates G, and each roller has a pinion H at one end of its shaft or trunnion. Each set of rollers and its pinions are provided with a gear I, which meshes with each pair of pinions H, and said gear is mounted on a short shaft J, projecting through plate G and end cap *e*, and a thumb-nut or milled head K for said shaft at the outside of said casing is used to rotate each gear I and its respective drivepinions and rollers independently of the other sets.

Each roller of the respective sets of rollers is provided with a disk or washer K′, mounted on the end thereof and between and flush with pinion H on shaft 3, and each washer fits within an opening L in plate M, forming a division-wall between the rollers and the gearing at one end of the casing, and said plate further serves to guide the strips, *a*, *b*, and *c*, in true alinement upon their respective rollers and also out of engagement or entanglement with the gears. Division-wall M also sets as inner journal for gear I.

The utility and advantage of having a series of similar index-columns for the several sheets is clearly shown by the following example: Thus to multiply "2,101,250" by "83" the first step is to set up heading number "2" on the first sheet *a*, then "101" on the second sheet *b*, then "250" on the third sheet *c*, so that the combined figures at the top of the sheets will read from left to right as "2,101,250". The multiplier "83" is seen in three places in line across the index-plate, one for each sheet, and the answer is found by beginning at the right and may be written down on paper step by step, if desired, and in that event the first item of the answer to be marked down would be "750", forming a part of the number "20,750", which is found under the column headed "250", directly opposite the index-figure "83" at the side of said column. Then the "20", which is the thousands of said number "20,750" on sheet *c*, is carried over to the column headed "101" and added to the figure "8,383" shown opposite index-figure "83" at the side of said column "101", thereby making the sum of "8,403,750". Then the "8", representing millions in this column, would be added to the number "166" in the millions column on sheet *a*, and which number is readily found as marked by index-figure "83", opposite said column on sheet *a*. The correct product, "174,403,750", is thus obtained without mistake or confusion, as each part of the answer is identified by the same index-figure at the several columns. Another example, showing the desirability of having index-figures in close proximity to each column, is to be found in a problem combining both multiplication and division. Thus, supposing the number "9,393" is to be divided by "101" and the quotient thereof to be multiplied by "250", the first step is to find "9,393" on sheet *b* under the column headed "101", and then the quotient is at once seen by referring to the index-column opposite said number "9,393" and which in this case is "93". Now to multiply this quotient "93" by "250", the next reference is to the index-column for sheet *c*, and when the column headed "250" is shown up the number in said column opposite the number "93" of the index-column will at once disclose the correct product, which in this example is "23,250."

What I claim is:

1. In a computing-machine, a casing having visual openings, two or more pairs of rollers in parallel alinement, the rollers of each pair being superposed one above the other, whereby the top rollers may be brought close together, and each pair being independently operative, in combination with an index-strip fixed between each pair of rollers and having in each instance the same series of index-numbers thereupon, the same numbers in each series being in transverse alinement, and a separate sheet for each pair of rollers having columns of figures in parallel alinement adapted to show through said visual openings, said openings being adjacent to and parallel with said index-strips, and the corresponding numbers on the sheets and the index-strips being also in transverse alinement.

2. In a computing-machine, a casing having visual openings, two or more pairs of rollers in parallel alinement, the rollers of each pair being superposed one above the other, whereby the top rollers may be brought close together, and each pair being independently operative, in combination with an index-strip fixed between each pair of rollers and having in each instance the same series of index-numbers, running from 1 to 100 thereupon, the same numbers in each series being in transverse alinement, and a separate sheet for each pair of rollers having columns of figures in parallel alinement adapted to show through said visual openings, said openings being adjacent to and parallel with said index-strips, and the corresponding numbers on the sheets and index-strips being also in transverse alinement.

3. In a computing-machine of the kind described, a casing, a series of pairs of rollers, each pair carrying a sheet, a gear-wheel at one end of each roller, a driving-gear for each pair of gear-wheels, a division-wall separating the ends of the rollers proper from said gear-wheels and driving-gear and forming a guide for said sheets and also an inner journal for the driving-gear, and a washer upon the end of each roller fitting within an opening in said division-wall.

4. In a computing machine, a plurality of sheets upon each of which numbers are arranged in transverse columns and in longitudinal lines, the numbers in one of said longitudinal lines on each sheet being distinguished from the other lines in said sheet by special figures, the special figures on one sheet running consecutively from "1" to a preselected number, the special figures on the next adjacent sheet running consecutively from a number that is greater by one than the said preselected number up to a second preselected number, the special figures on the third sheet running consecutively from a number that is greater by one than the said second preselected number to a third preselected number, and so on throughout the capacity of the machine, an index coöperating with said sheets and carrying numbers arranged in a column parallel with the transverse columns on the sheets and transversely opposite the numbers therein, the numbers in the index running consecutively from a low to a higher number, each number in each of the transverse columns on the sheets being the product of the number in the index opposite thereto into the number composed of special figures in said column, and means for producing a relative movement between each sheet and the index, whereby the index and any column on any sheet may be brought into juxta-position.

5. In a computing machine, a plurality of sheets upon each of which numbers are arranged in transverse columns and in longitudinal lines, the numbers in one of said longitudinal lines on each sheet being distinguished from the other lines in said sheet by special figures, the special figures on one sheet running consecutively from "1" to a preselected number, the special figures on the next adjacent sheet running consecutively from a number that is greater by one than the said preselected number up to a second preselected number, the special figures on the third sheet running consecutively from a number that is greater by one than the said second preselected number to a third preselected number, and so on throughout the capacity of the machine, a stationary index coöperating with said sheets and carrying numbers arranged in a column parallel with the transverse columns on the sheets and transversely opposite the numbers therein, the numbers in the index running consecutively from a low to a higher number, each number in each of the transverse columns on the sheets being the product of the number in the index opposite thereto into the number composed of special figures in said column, and means for moving each sheet relatively to the index, whereby the index and any column on any sheet may be brought into juxtaposition.

6. In a computing machine, a plurality of pairs of rollers mounted in said casing, a plurality of sheets, one for each pair of rollers, upon each of which numbers are arranged in transverse columns and in longitudinal lines, the sheets being so placed in the machine that the longitudinal lines are in alinement across the machine, the numbers in one of said longitudinal lines on each sheet being distinguished from the other lines in said sheet by special figures, the special figures on one sheet running consecutively from "1" to a preselected number, the special figures on the next adjacent sheet running consecutively from a number that is greater by one than the said preselected number up to a second preselected number, the special figures on the third sheet running consecutively from a number that is greater by one than the said second preselected number to a third preselected number, and so on throughout the capacity of the machine, a stationary index coöperating with said sheets and carrying numbers arranged in a column parallel with the transverse columns on the sheets and transversely opposite the numbers therein, the numbers in the index running consecutively from "2" to a higher number, each number in each of the transverse columns on the sheets being the product of the number, in the index opposite thereto into the number composed of special figures in said column, and means for turning the sets of rollers so as to move each sheet and bring its transverse columns into juxtaposition with the index.

7. In a computing machine, a plurality of sheets upon which numbers are arranged in transverse columns and in longitudinal lines, one of the longitudinal lines on each sheet differing in appearance from the other longitudinal lines thereon, said different appearing line on one sheet containing numbers running consecutively from "1" to "100", the corresponding line in the next adjacent sheet containing numbers running consecutively from "101" to "200", the corresponding line in the next adjacent sheet containing numbers running consecutively from "201" to "300", and so on throughout the several sheets in the machine, an index arranged to coöperate with the several sheets and carrying numbers arranged in a column parallel with the transverse columns on the sheets and transversely opposite the numbers therein, the numbers in the index running consecutively from a low to a higher number, each number in each of the transverse columns on the sheets being the product of the number in the index opposite thereto into the number in that column that is located in the said differently appearing line, and means for producing a relative movement between each sheet and the index, whereby the index and any column on any sheet may be brought into juxtaposition.

8. In a computing machine, a plurality of sheets upon which numbers are arranged in transverse columns and in longitudinal lines, one of the longitudinal lines on each sheet differing in appearance from the other longitudinal lines thereon, said different appearing line on one sheet containing numbers running consecutively from "1" to "100", the corresponding line in the next adjacent sheet containing numbers running consecutively from "101" to "200", the corresponding line in the next adjacent sheet containing numbers running from "201" to "300", and so on throughout the several sheets in the machine, a stationary index arranged to coöperate with the several sheets and carrying numbers arranged in a column parallel with the transverse columns on the sheets and transversely opposite the numbers therein, the numbers in the index running consecutively from "2" to "100", each number in each of the transverse columns on the sheets being the product of the number in the index opposite thereto into the number in that column that is located in the said differently appearing line, and means for moving each of the sheets independently so as to bring any column therein into juxtaposition with the index.

9. In a computing machine, a casing, a plurality of sets of rollers, a plurality of sheets mounted upon said rollers, said sheets having numbers thereon arranged in transverse columns and in longitudinal lines, one of the longitudinal lines on each sheet differing in appearance from the other longitudinal lines thereon, said different appearing line on one sheet containing numbers running consecutively from "1" to "100", the corresponding line in the next adjacent sheet containing numbers running consecutively from "101" to "200", the corresponding line in the next adjacent sheet containing numbers running from "201" to "300" and so on throughout the several sheets in the machine, a stationary index arranged to coöperate with the several sheets and carrying numbers arranged in a column parallel with the transverse columns on the sheets and transversely opposite the numbers therein, the numbers in the index running consecutively from "2" to "100", each number in each of the transverse columns on the sheets being the product of the number in the index opposite thereto into the number in that column that is located in the said differently appearing line, and means for turning the sets of rollers independently so as to bring any column on any sheet into juxtaposition with the index.

In testimony whereof, I hereunto affix my signature in the presence of two witnesses.

ADOLPHUS S. DENNIS.

Witnesses:

FERD BACH,

MARGARET MOORE.